United States Patent
Konishi et al.

(10) Patent No.: US 12,255,318 B2
(45) Date of Patent: Mar. 18, 2025

(54) NON-AQUEOUS ELECTROLYTE BATTERY AND METHOD FOR MANUFACTURING SAME

(71) Applicant: Maxell, Ltd., Kyoto (JP)

(72) Inventors: Hikaru Konishi, Kyoto (JP); Soichi Watari, Kyoto (JP); Koya Nakatani, Kyoto (JP)

(73) Assignee: MAXELL, LTD., Kyoto (JP)

( * ) Notice: Subject to any disclaimer, the term of this patent is extended or adjusted under 35 U.S.C. 154(b) by 594 days.

(21) Appl. No.: 17/615,902

(22) PCT Filed: Jun. 5, 2020

(86) PCT No.: PCT/JP2020/022239
§ 371 (c)(1),
(2) Date: Dec. 2, 2021

(87) PCT Pub. No.: WO2020/250816
PCT Pub. Date: Dec. 17, 2020

(65) Prior Publication Data
US 2022/0320497 A1    Oct. 6, 2022

(30) Foreign Application Priority Data

Jun. 10, 2019   (JP) .................................. 2019-107769

(51) Int. Cl.
*H01M 4/00*    (2006.01)
*H01M 4/04*    (2006.01)
(Continued)

(52) U.S. Cl.
CPC ............. *H01M 4/366* (2013.01); *H01M 4/04* (2013.01); *H01M 4/382* (2013.01); *H01M 4/405* (2013.01);
(Continued)

(58) Field of Classification Search
CPC .......... H01M 4/38; H01M 4/40; H01M 4/587; H01M 4/04; H01M 4/62
See application file for complete search history.

(56) References Cited

U.S. PATENT DOCUMENTS 9,985,285 B2 *  5/2018  Yang ................... H01M 4/0461
2003/0152839 A1  8/2003  Kawai et al.
(Continued)

FOREIGN PATENT DOCUMENTS

EP    1 320 143 A2    6/2003
EP    1 798 803 A2    6/2007
(Continued)

OTHER PUBLICATIONS

Hosoda et al. Binder for Secondary Battery, Electrode Mixture for Secondary Battery, Electrode for Secondary Battery and Secondary Battery, May 2019, See the Abstract. (Year: 2019).*
(Continued)

*Primary Examiner* — Anca Eoff
*Assistant Examiner* — Monique M Wills
(74) *Attorney, Agent, or Firm* — WHDA, LLP (57) ABSTRACT

The non-aqueous electrolyte battery is excellent in high-temperature storage characteristics and load characteristics at low temperature. A non-aqueous electrolyte battery of the present invention includes a positive electrode, a negative electrode, a separator, and a non-aqueous electrolyte. The negative electrode includes a lithium layer, a lithium-aluminum alloy layer formed on a surface of the lithium layer, and a carbon layer on the lithium-aluminum alloy layer. The non-aqueous electrolyte battery of the present invention can be manufactured by a method for manufacturing a non-aqueous electrolyte battery that includes providing an aluminum layer on the surface of the lithium layer to obtain a laminate, forming the carbon layer on a surface of the (Continued)

aluminum layer to obtain a laminate for a negative electrode, and causing the lithium layer and the aluminum layer of the laminate for a negative electrode to react with each other to form the lithium-aluminum alloy layer.

18 Claims, 2 Drawing Sheets

(51) Int. Cl.
      *H01M 4/36*     (2006.01)
      *H01M 4/38*     (2006.01)
      *H01M 4/40*     (2006.01)
      *H01M 4/587*    (2010.01)
      *H01M 4/62*     (2006.01)
      *H01M 6/14*     (2006.01)
      *H01M 10/052*   (2010.01)
      *H01M 4/02*     (2006.01)

(52) U.S. Cl.
      CPC ........... *H01M 4/587* (2013.01); *H01M 4/622* (2013.01); *H01M 6/14* (2013.01); *H01M 10/052* (2013.01); *H01M 2004/027* (2013.01)

(56) References Cited

U.S. PATENT DOCUMENTS

| | | |
|---|---|---|
| 2005/0118507 A1 | 6/2005 | Guterman et al. |
| 2006/0115728 A1 | 6/2006 | Kawai et al. |
| 2006/0127778 A1 | 6/2006 | Kawai et al. |
| 2009/0123844 A1 | 5/2009 | Morigaki et al. |
| 2010/0273059 A1 | 10/2010 | Sano |
| 2011/0070484 A1 | 3/2011 | Sano |
| 2013/0309571 A1 | 11/2013 | Yoon et al. |
| 2014/0162108 A1* | 6/2014 | Visco .................. H01M 50/466 429/131 |

FOREIGN PATENT DOCUMENTS

| | | | | |
|---|---|---|---|---|
| EP | 1 801 901 A1 | 6/2007 | | |
| JP | 3-216960 A | 9/1991 | | |
| JP | 4-162372 A | 6/1992 | | |
| JP | 2004-47413 A | 2/2004 | | |
| JP | 2006-269173 A | 10/2006 | | |
| JP | 2010-86736 A | 4/2010 | | |
| JP | 2010-257828 A | 11/2010 | | |
| JP | 2011-91034 A | 5/2011 | | |
| JP | 2011165480 A * | 8/2011 | ............. | Y02E 60/10 |
| JP | 2016-201197 A | 12/2016 | | |
| WO | 01/39303 A1 | 5/2001 | | |
| WO | 01/97304 A1 | 12/2001 | | |
| WO | 02/41416 A2 | 5/2002 | | |
| WO | 2006/057110 A1 | 6/2006 | | |
| WO | WO-2019087652 A1 * | 5/2019 | ............ | C08F 214/22 |

OTHER PUBLICATIONS

Nakai, Composition for Secondary Battery, Electrode for Secondary Battery, and Secondary Battery, Aug. 2011, See the Abstract. (Year: 2011).*

International Search Report dated Aug. 4, 2020, issued in counterpart International Application No. PCT/JP2020/022239 (2 pages).

Office Action dated Jun. 10, 2022, issued in counterpart EP application No. 20 823 605.9. (6 pages).

Extended (Supplementary) European Search Report dated May 30, 2022, issued in counterpart EP application No. 20823605.9. (4 pages).

* cited by examiner

NON-AQUEOUS ELECTROLYTE BATTERY AND METHOD FOR MANUFACTURING SAME

TECHNICAL FIELD

The present invention relates to a non-aqueous electrolyte battery excellent in high-temperature storage characteristics and load characteristics at low temperature, and a method for manufacturing the battery.

BACKGROUND ART

At present, non-aqueous electrolyte batteries including a non-aqueous electrolyte such as lithium primary batteries and lithium ion secondary batteries are used in various fields such as power sources of portable devices, or power sources of pressure sensors inside tires where the batteries are exposed to high temperatures and experience strong vibrations. With the widespread use of the batteries, many attempts have been made to improve their various characteristics.

However, when such a battery is stored at a high temperature, a reaction between an electrolyte and an electrode can occur, thereby leading to, e.g., swelling of the battery. Thus, in applications where the battery is used in a high temperature environment, there is a need for a countermeasure to suppress the reaction between the electrolyte and the electrode.

To deal with this issue, a sulfur compound such as propane sultone has been known as an additive to form a coating on a surface of the positive electrode or the negative electrode to suppress the reaction with an electrolyte, and thus can suppress the swelling of a battery in high temperature storage (see Patent Document 1).

Patent Document 2 discloses a battery that includes a non-aqueous electrolyte containing lithium bis(oxalate)borate [$LiB(C_2O_4)_2$] and $LiBF_4$ at a molar ratio of 2:8 to 5:5. Use of this non-aqueous electrolyte prevents an increase in the internal resistance caused by water liberated from the positive electrode active material into the electrolyte at a high temperature, and an increase in the internal pressure caused by decomposition of the electrolyte. Thus, the battery can exhibit excellent characteristics at a low temperature as well as at a high temperature.

However, when an electrolyte contains an additive such as propane sultone or lithium bis(oxalate)borate to obtain a sufficient effect, a coating formed on, e.g., a surface of the negative electrode interferes with the discharge reaction, thereby increasing an internal resistance of a battery. Consequently, the discharge characteristics are likely to be reduced after the high temperature storage.

On the other hand, Patent Documents 3 and 4 propose to form a layer containing carbon on a surface of a negative electrode instead of the additive.

PRIOR ART DOCUMENTS

Patent Documents

Patent Document 1: JP 2004-047413 A
Patent Document 2: JP 2006-269173 A
Patent Document 3: JP 2010-257828 A
Patent Document 4: JP 2011-091034 A

DISCLOSURE OF INVENTION

Problem to be Solved by the Invention

However, the non-aqueous electrolyte batteries have been required to exhibit battery characteristics that enable the batteries to be used in a wide temperature range from a low temperature to a high temperature. Further investigation has been required to achieve storage characteristics at a high temperature and load characteristics at a low temperature.

With the foregoing in mind, it is an object of the present invention to provide a non-aqueous electrolyte battery excellent in high-temperature storage characteristics and load characteristics at a low temperature, and a method for manufacturing the battery.

Means for Solving Problem

A non-aqueous electrolyte battery of the present invention includes a positive electrode, a negative electrode, a separator, and a non-aqueous electrolyte. The negative electrode includes a lithium layer, a lithium-aluminum alloy layer formed on a surface of the lithium layer, and a carbon layer on the lithium-aluminum alloy layer.

The non-aqueous electrolyte battery of the present invention can be manufactured by a manufacturing method (manufacturing method of the non-aqueous electrolyte battery of the present invention) that includes layering an aluminum layer on the surface of the lithium layer, forming the carbon layer on a surface of the aluminum layer, and causing the lithium layer and the aluminum layer to react with each other in order to form the lithium-aluminum alloy layer on the surface of the lithium layer.

Effects of the Invention

The present invention can provide a non-aqueous electrolyte battery excellent in high-temperature storage characteristics and load characteristics at a low temperature, and a method for manufacturing the battery.

DESCRIPTION OF THE INVENTION

A non-aqueous electrolyte battery of the present invention includes a negative electrode. The negative electrode includes a lithium layer, a lithium-aluminum alloy layer formed on a surface of the lithium layer, and a carbon layer on the lithium-aluminum alloy layer. Although the reasons are not clear, it is possible to suppress the deterioration of the characteristics of the non-aqueous electrolyte battery in high temperature storage and enhance load characteristics of the battery at a low temperature after the high temperature storage (e.g., load characteristics at a low temperature of about −40° C.) by using the negative electrode.

The lithium-aluminum alloy layer of the negative electrode can be formed by, e.g., providing an aluminum layer made of an aluminum foil or aluminum alloy foil on the surface of the lithium layer made of a lithium foil or lithium alloy foil to obtain a laminate; forming the carbon layer on a surface of the aluminum layer of the laminate (i.e., the surface that is opposite to the lithium layer) to obtain a laminate for a negative electrode; and bringing the laminate for a negative electrode into contact with a non-aqueous electrolyte to cause a reaction between the lithium layer and the aluminum layer.

As one embodiment, a laminate for a negative electrode can be brought into contact with a non-aqueous electrolyte to form a lithium-aluminum alloy layer before assembling a battery. In this case, such a negative electrode is obtained by converting the aluminum layer of the laminate for a negative electrode into a lithium-aluminum alloy layer, followed by assembling a non-aqueous electrolyte battery by using the negative electrode. Alternatively, a non-aqueous electrolyte battery can be assembled not by using the negative electrode but by using the laminate for a negative electrode. In assembling a battery in this case, the laminate for a negative electrode can be brought into contact with a non-aqueous electrolyte to form a lithium-aluminum alloy layer in the same manner as explained above. In this manner, the negative electrode can be obtained. Since a process of producing the negative electrode before assembling a battery can be simplified in this manner, the battery productivity can be further enhanced. Thus, the negative electrode is preferably produced in assembling a battery.

Examples of the lithium foil or lithium alloy foil for constituting the lithium layer can include: a foil made of Li (and unavoidable impurities) (i.e., a lithium foil); and a foil made of a Li alloy (i.e., a lithium alloy foil) that contains an alloying component such as Fe, Ni, Co, Mn, Cr, V, Ti, Zr, Nb, Mo, etc. at a total amount of 40% by mass or less, preferably 10% by mass or less, and more preferably 5% by mass or less, and a remainder of Li and unavoidable impurities.

The thickness of the lithium foil or lithium alloy foil for constituting the lithium layer is preferably 0.1 to 1.5 mm.

Examples of the aluminum foil or aluminum alloy foil for constituting the aluminum layer can include: a foil made of Al (and unavoidable impurities) (i.e., an aluminum foil); and a foil made of an Al alloy (i.e., an aluminum alloy foil) that contains an alloying component such as Fe, Ni, Co, Mn, Cr, V, Ti, Zr, Nb, Mo, etc. and a remainder of Al and unavoidable impurities (the content of the alloying component is, e.g., 50% by mass or less, preferably 10% by mass or less, and more preferably 5% by mass or less in total).

In order to clearly exhibit the effects of the present invention by forming the lithium-aluminum alloy layer, the thickness of the aluminum foil or aluminum alloy foil for constituting the aluminum layer is preferably 1 µm or more, more preferably 3 µm or more, and particularly preferably 5 µm or more.

On the other hand, if the proportion of the lithium-aluminum alloy layer to the lithium layer is too large, the capacity of the negative electrode could decrease. In addition, a crack might occur on the aluminum layer (or aluminum alloy layer) because of volume expansion when the aluminum layer is alloyed with lithium. If the aluminum layer is thickened, the crack could occur deeply toward the inside of the negative electrode, and a part of the aluminum alloy layer might drop off in large vibration. Thus, in order to set the thickness of the lithium-aluminum alloy layer to be formed to be a certain value or less, the thickness of the aluminum foil or aluminum alloy foil is preferably 20 µm or less, and more preferably 15 µm or less.

The aluminum alloy layer is not necessarily formed on the entire surface of the lithium layer. The aluminum alloy layer can be formed on a part of the surface of the lithium layer. However, as the proportion of an area where the aluminum alloy layer is formed is larger, the effects of the present invention will be obtained more significantly. Thus, the proportion of the area in the surface of the lithium layer where the aluminum alloy layer is formed is preferably 40% or more, more preferably 70% or more, and most preferably 100%. That is, most preferably, the aluminum alloy layer is formed on the entire surface of the lithium layer.

The aluminum layer can be formed on one side or both sides of the lithium layer depending on the form of the battery. For example, in a battery in which positive electrodes are provided on opposite sides of a lithium layer of a negative electrode, aluminum layers can be provided on both sides of the lithium layer to form lithium-aluminum alloy layers.

A laminate of a lithium layer and an aluminum layer can be formed by, e.g., layering the aluminum foil or aluminum alloy foil for constituting the aluminum layer on the lithium foil or lithium alloy foil for constituting the lithium layer, followed by pressure-bonding them to each other.

The carbon layer of the negative electrode can be composed of carbon alone (its particles), but can contain carbon and a binder.

Examples of the carbon that constitutes the carbon layer can include: carbon blacks such as furnace black, channel black, acetylene black, and thermal black; and graphites such as natural graphite (e.g., flake graphite) and artificial graphite. These can be used alone or in combination of two or more.

Examples of the binder that can be used in the carbon layer can include polyvinylidene fluoride (PVDF), polytetrafluoroethylene (PTFE), styrene-butadiene rubber (SBR), carboxymethyl cellulose (CMC), and polyvinylpyrrolidone. In particular, it is preferable to use a compound having a five-membered ring lactam structure such as polyvinylpyrrolidone as it can favorably form a dispersion of a fine carbon material such as carbon black in a state of being dissolved in a solvent.

The content of the binder in the carbon layer is preferably 2% by mass or less, more preferably 1% by mass or less, and particularly preferably 0.5% by mass or less.

From the viewpoint of favorably ensuring the effects of forming the carbon layer, the carbon layer of the negative electrode has an area weight of preferably 0.15 mg/cm$^2$ or more, more preferably 0.3 mg/cm$^2$ or more, and particularly preferably 0.5 mg/cm$^2$ or more. However, even if the carbon layer is thickened, the effects become saturated. Moreover, if the entire negative electrode is thickened, for example, the amount of a positive electrode active material that can be introduced into the battery is reduced, which could decrease a capacity of the battery. Thus, from the viewpoint of, e.g., increasing the capacity of the battery, the carbon layer of the negative electrode has an area weight of preferably 1.5 mg/cm$^2$ or less, and more preferably 1.0 mg/cm$^2$ or less.

The carbon layer is not necessarily formed on the entire surface of the aluminum alloy layer. The carbon layer can be formed on a part of the surface of the aluminum alloy layer. That is, it is possible that a part of the aluminum alloy layer is not be covered with the carbon layer and is exposed on a surface of the negative electrode. For example, when the lithium-aluminum alloy layer is formed, a surface of the lithium-aluminum alloy layer can have irregularities, and a projection can be exposed on the surface of the negative electrode. On a part of the surface of the lithium layer, it is possible that there is a portion where the aluminum alloy layer is not formed and the carbon layer is directly formed.

However, as the proportion of an area of a portion where the aluminum alloy layer and the carbon layer are formed is larger on the lithium layer, the effects of the present invention can be obtained more significantly. Thus, the proportion of the area where the carbon layer is formed on the surface of the aluminum alloy layer is preferably 40% or more, more preferably 70% or more, and particularly preferably 100%. That is, particularly preferably, the carbon layer is formed on the entire surface of the aluminum alloy layer.

Further, it is most preferable that the aluminum alloy layer is formed on the entire surface of the lithium layer and the carbon layer is formed on the entire surface of the aluminum alloy layer.

The carbon layer can be formed by, e.g., dispersing the carbon as well as the binder that can be optionally added in an organic solvent (the binder can be dissolved) to prepare a composition for forming a carbon layer (liquid composition such as paste or slurry); applying the composition to the surface of the aluminum layer of the laminate that has the lithium layer and the aluminum layer; and drying the composition.

Preferably, the organic solvent used in the composition for forming a carbon layer is a solvent used in the non-aqueous electrolyte of the battery. Specific examples thereof can include: cyclic carbonates such as ethylene carbonate, propylene carbonate (PC), butylene carbonate, and vinylene carbonate; chain carbonates such as dimethyl carbonate, diethyl carbonate, and methyl ethyl carbonate; ethers such as 1,2-dimethoxyethane (DME), diglyme (diethylene glycol dimethyl ether), triglyme (triethylene glycol dimethyl ether), tetraglyme (tetraethylene glycol dimethyl ether), methoxyethoxyethane, 1,2-diethoxyethane, and tetrahydrofuran; cyclic esters such as γ-butyrolactone; and nitrile. These can be used alone or in combination of two or more. However, a carbonic acid ester such as propylene carbonate can react with lithium to form lithium carbonate, and the reactivity of the negative electrode surface can be reduced. Thus, from the viewpoint of more significantly obtaining the effects of the present invention, a solvent other than a carbonic acid ester is preferably used, an ether is more preferably used, and DME is further preferably used.

The organic solvent used in the composition for forming a carbon layer can also be a solvent used in preparing a coating material such as slurry that has a positive electrode active material. When a fine carbon material such as carbon black is used, it is preferable to use a compound having a five-membered ring lactam structure such as 2-pyrrolidone or N-methyl-2-pyrrolidone (NMP) as it can favorably form a dispersion of the carbon material. Also, the compound having a five-membered ring lactam structure can be mixed with a solvent used in the non-aqueous electrolyte.

The negative electrode can be constituted by the lithium layer, the lithium-aluminum alloy layer, and the carbon layer only, but can further include a current collector optionally.

The negative electrode current collector can be made of copper, nickel, iron, or stainless steel, and can be in the form of e.g., a plain-woven wire mesh, an expanded metal, a lath mesh, a punched metal, a metal foam, or a foil (plate). The thickness of the current collector is preferably, e.g., 5 to 100 μm. It is also desirable to apply a pasty conductive material such as a carbon paste or a silver paste to a surface of the current collector.

A positive electrode of the non-aqueous electrolyte battery can be made into a shaped body obtained by forming a mixture (i.e., a positive electrode mixture) containing, e.g., a positive electrode active material, a conductive assistant, and a binder into a pellet or the like. The positive electrode can also have a structure in which a layer composed of the positive electrode mixture (i.e., a positive electrode mixture layer) is provided on one side or both sides of a current collector.

Examples of the positive electrode active material can include: manganese dioxide; lithium-containing composite oxides such as lithium-containing manganese oxides and $Li_aTi_{5/3}O_4$ ($4/3 \leq a < 7/3$); vanadium oxide; niobium oxide; titanium oxide;

sulfides such as iron disulfide; and graphite fluoride. Examples of the lithium-containing manganese oxides can include: $LiMn_3O_6$; and composite oxides having the same crystal structure as that of manganese dioxide (having a structure of, e.g., a β type, γ type, or combination of β and γ types) and a Li content of 3.5% by mass or less, preferably 2% by mass or less, more preferably 1.5% by mass or less, and particularly preferably 1% by mass or less.

Examples of the conductive assistant of the positive electrode mixture can include flake graphite, acetylene black, Ketjen black, and carbon black. These can be used alone or in combination of two or more.

Examples of the binder of the positive electrode mixture can include fluorocarbon polymers such as PVDF, and a polymer of hexafluoride propylene. These can be used alone or in combination of two or more.

When the positive electrode is a shaped body of the positive electrode mixture, it can be produced in the following manner. For example, the positive electrode mixture is prepared by mixing, e.g., the positive electrode active material, the conductive assistant, and the binder, and then is formed into a predetermined shape under pressure.

When the positive electrode includes a positive electrode mixture layer and a current collector, it can be produced in the following manner. For example, a positive electrode mixture containing composition (slurry, paste, etc.) is prepared by dispersing, e.g., the positive electrode active material, the conductive assistant, and the binder in water or an organic solvent such as N-methyl-2-pyrrolidone (NMP) (the binder can be dissolved in the solvent). Then, the composition is applied to the current collector, dried, and optionally pressed by calendering or the like.

However, the production method of the positive electrode is not limited to those described above, and the positive electrode can be produced by other methods.

In the composition of the positive electrode mixture of the positive electrode, the amount of the positive electrode active material is preferably 80 to 90% by mass, the content of the conductive assistant is preferably 1.5 to 10% by mass, and the content of the binder is preferably 0.3 to 10% by mass.

The thickness of the shaped body of the positive electrode mixture is preferably 0.15 to 4 mm. On the other hand, in the case of the positive electrode that includes the positive electrode mixture layer and the current collector, the thickness of the positive electrode mixture layer (per one side of the current collector) is preferably 30 to 300 μm.

The current collector used for the positive electrode can be made of, e.g., stainless steel such as SUS316, SUS430, or SUS444, and can be in the form of, e.g., a plain-woven wire mesh, an expanded metal, a lath mesh, a punched metal, a metal foam, or a foil (plate). The thickness of the current collector is preferably, e.g., 0.05 to 0.2 mm. It is also desirable that a pasty conductive material such as a carbon paste or a silver paste be applied to the surface of the current collector.

The non-aqueous electrolyte battery of the present invention can be assembled by using the following bodies. For example, the negative electrode and the positive electrode can be laminated via a separator to form a laminate (laminated electrode body). Moreover, this laminate can be spirally wound to form a wound body (wound electrode body).

Further, this wound body can be shaped into a flat wound body with a flat cross section (flat wound electrode body). The non-aqueous electrolyte battery of the present invention can be assembled in the following manner by using the positive electrode that is the shaped body of the positive electrode mixture and the negative electrode. The positive electrode, the negative electrode, and the separator can be housed in a flat battery case, with the separator interposed between the positive electrode and the negative electrode.

The battery can also be assembled not by using the negative electrode but by using the laminate for a negative electrode. In this case, the negative electrode can be formed in assembling the battery.

The separator can be, e.g., a nonwoven fabric or a microporous membrane (microporous film) made of polyolefin such as polyethylene (PE), polypropylene (PP), or an ethylene-propylene copolymer. Moreover, when heat resistance is required in relation to the intended use of the battery, the nonwoven fabric or the microporous membrane can also be made of, e.g., a fluorocarbon polymer such as a tetrafluoroethylene-perfluoroalkoxyethylene copolymer (PFA); polyphenylene sulfide (PPS); polyether ether ketone (PEEK); polybutylene terephthalate (PBT); polymethylpentene; polyamide; polyimide; aramid; or cellulose. These materials of the nonwoven fabric or the microporous membrane can be used alone or in combination of two or more. The separator can be of a single layer structure of the nonwoven fabric or the microporous membrane made of one of the materials listed above. Alternatively, the separator can be of e.g., a laminated structure of a plurality of nonwoven fabrics or microporous membranes made of different materials.

From the viewpoint of suppressing a reduction of the energy density of the battery, the thickness of the separator can be, e.g., 500 μm or less, preferably 450 μm or less, and more preferably 300 μm or less. However, if the separator is too thin, its function of preventing a short circuit can be reduced. Thus, when the nonwoven fabric is used, the thickness of the separator can be, e.g., 30 μm or more, preferably 100 μm or more, and more preferably 150 pin or more. When the microporous membrane is used, the thickness of the separator is preferably 10 μm or more, and more preferably 15 μm or more.

The non-aqueous electrolyte of the non-aqueous electrolyte battery can be prepared by dissolving an electrolyte such as $LiPF_6$, $LiBF_4$, $LiClO_4$, or $LiCF_3SO_3$ in an organic solvent. Examples of the organic solvent can include: cyclic carbonates such as ethylene carbonate, propylene carbonate, butylene carbonate, and vinylene carbonate; chain carbonates such as dimethyl carbonate, diethyl carbonate, and methyl ethyl carbonate; ethers such as 1,2-dimethoxyethane, diglyme (diethylene glycol dimethyl ether), triglyme (triethylene glycol dimethyl ether), tetraglyme (tetraethylene glycol dimethyl ether), methoxyethoxyethane, 1,2-diethoxyethane, and tetrahydrofuran; cyclic esters such as γ-butyrolactone; and mononitriles such as acetonitrile and propionitrile. These can be used alone or in combination of two or more. In particular, it is preferable to use any combination of the carbonates and the ethers.

When the carbonate and the ether are used in combination as the solvent of the non-aqueous electrolyte, a quantity ratio (mixing ratio) of the carbonate and the ether (carbonate: ether) in the total solvent is preferably 30:70 to 70:30 in a volume ratio.

The concentration of the electrolyte in the non-aqueous electrolyte is preferably 0.3 to 1.5 mol/l.

Further, the non-aqueous electrolyte can optionally contain an additive in order to, e.g., improve storage characteristics at a high temperature. Examples of the additive to be used can include: saturated sultone compounds such as 1,3-propanesultone and 1,4-butanesultone; unsaturated sultone compounds such as 1,3-propenesultone; acid anhydrides such as maleic anhydride and phthalic anhydride; organic boron lithium salts such as $LiB(B_2O_4)_2$; and dinitriles such as malononitrile, succinonitrile, glutaronitrile, and adiponitrile. These can be used alone or in combination of two or more.

The content of the additive in the non-aqueous electrolyte is, e.g., preferably 0.1% by mass or more, more preferably 0.3% by mass or more, and particularly preferably 0.5% by mass or more. On the other hand, if the content of the additive is too high, the internal resistance of the battery can increase, and the discharge characteristics can deteriorate. Thus, the content of the additive in the non-aqueous electrolyte is preferably 3% by mass or less, more preferably 2% by mass or less, and particularly preferably 1.5% by mass or less.

The form of the non-aqueous electrolyte battery is not particularly limited, and the battery can be in any form, e.g., a flat-type battery (including a coin-type battery and a button-type battery), a laminated-type battery, and a tubular-type battery (including a cylindrical battery and a rectangular (prismatic) battery). As an outer case (battery case) for housing the negative electrode, the positive electrode, the separator, and the non-aqueous electrolyte, a metallic can (outer can) having an opening can be used in combination with a lid (sealing can), or a metallic laminated film can be used.

Specifically, the outer can and the sealing can can be sealed by crimping via a gasket or can be welded to seal the joint between them. In this manner, a flat-type battery or a tubular-type battery can be produced. Alternatively, two metallic laminated films can be laid on each other and sealed by attaching their peripheries to each other, or one metallic laminated film can be folded and sealed by attaching the ends thereof to each other. In this manner, a laminated-type battery can be produced.

When the outer case is sealed by crimping, the gasket interposed between the outer can and the sealing can be made of, e.g., PP or nylon. Moreover, when particularly high heat resistance is required in relation to the intended use of the battery, the gasket can also be made of a heat-resistant resin with a melting point or heat decomposition temperature of 200° C. or higher such as a fluorocarbon polymer such as PFA; polyphenylene ether (PEE); polysulfone (PSF); polyarylate (PAR); polyether sulfone (PES); PPS; or PEEK. Further, when the intended use of the battery requires heat resistance, the outer case can be sealed by a glass hermetic seal.

EXAMPLES

Hereinafter, the present invention will be described in detail by way of examples. However, the present invention is not limited to the following examples.

Example 1

Production of Positive Electrode

A positive electrode mixture was prepared by mixing manganese dioxide (i.e., a positive electrode active material), carbon black (i.e., a conductive assistant), and PTFE (i.e., a binder) at a mass ratio of 90:5:5. Then, the positive electrode mixture was formed into a positive electrode (positive electrode mixture shaped body) with a diameter of 16 mm and a thickness of 1.8 mm.

Production of Laminate for Negative Electrode

An aluminum foil with a thickness of 9 μm was pressure-bonded to a surface of a lithium foil with a thickness of 1.2 mm, and these were then punched into a circle with a diameter of 16 mm to produce a laminate of a lithium layer and an aluminum layer.

Next, acetylene black was dispersed in propylene carbonate to prepare a composition for forming a carbon layer (slurry). The slurry was applied to the aluminum layer of the laminate and was dried. Thus, a laminate for a negative electrode in which a carbon layer composed of acetylene black was formed on the entire surface of the aluminum layer of the laminate was produced. The carbon layer had an area weight of 0.5 mg/cm$^2$.

Preparation of Non-Aqueous Electrolyte

Propylene carbonate and 1,2-dimethoxyethane were mixed at a volume ratio of 1:1 to prepare a mixed solvent, and LiClO$_4$ was dissolved in the mixed solvent at a concentration of 0.5 mol/l, and 2% by mass of 1,3-propanesultone was further added thereto to prepare a non-aqueous electrolyte.

Assembly of Battery

Figure 1:
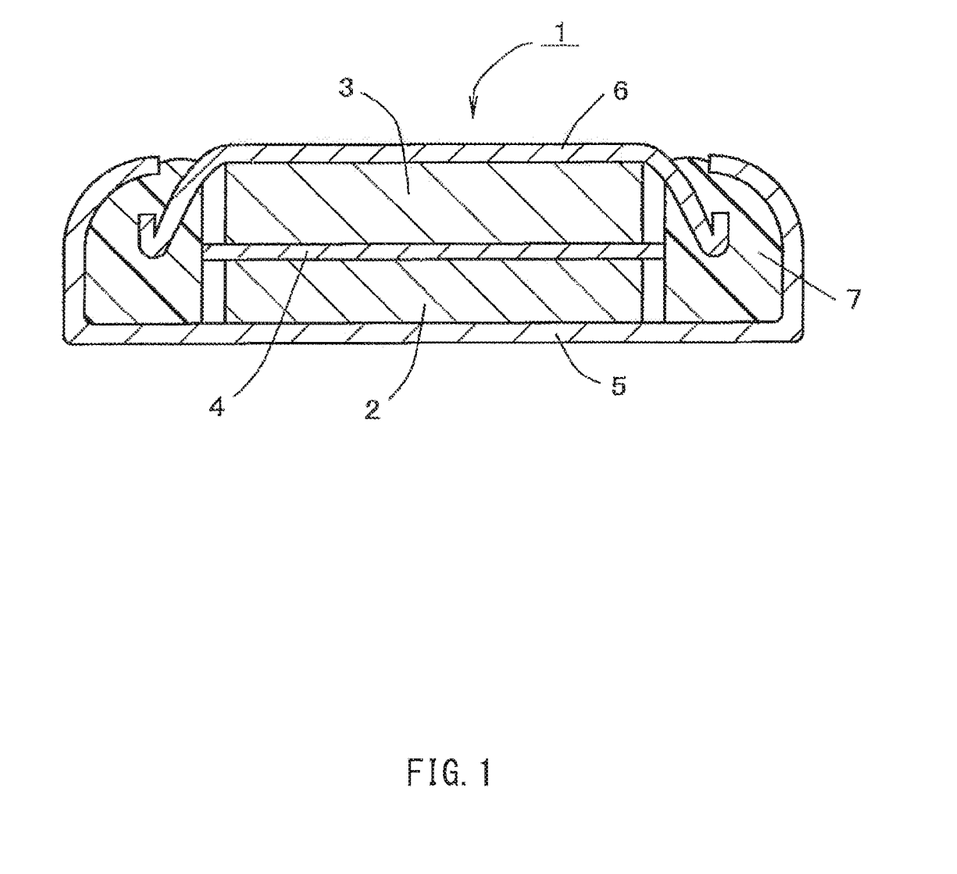
FIG. 1 is a vertical cross-sectional view schematically illustrating an example of a non-aqueous electrolyte battery of the present invention.

A coin-type non-aqueous electrolyte primary battery having a structure illustrated in FIG. 1, a diameter of 20 mm and a height of 3.2 mm was assembled by using the positive electrode, the laminate for a negative electrode, the non-aqueous electrolyte, and a polymethylpentene nonwoven fabric (thickness: 320 μm) used as a separator.

A lithium-aluminum alloy layer was formed on the surface of the lithium layer by bringing the laminate for a negative electrode into contact with the non-aqueous electrolyte. Thus, a negative electrode further including the carbon layer on the lithium-aluminum alloy layer was produced in the battery.

Example 2

A coin-type non-aqueous electrolyte primary battery was assembled in the same manner as in Example 1 except that a carbon layer on a surface of a laminate for a negative electrode had an area weight of 0.02 mg/cm$^2$.

Example 3

A coin-type non-aqueous electrolyte primary battery was assembled in the same manner as in Example 1 except that a carbon layer on a surface of a laminate for a negative electrode had an area weight of 0.2 mg/cm$^2$.

Example 4

A coin-type non-aqueous electrolyte primary battery was assembled in the same manner as in Example 1 except that a carbon layer on a surface of a laminate for a negative electrode had an area weight of 1 mg/cm$^2$.

Example 5

A coin-type non-aqueous electrolyte primary battery was assembled in the same manner as in Example 1 except that acetylene black was dispersed in 1,2-dimethoxyethane to prepare slurry, and the slurry was used to form a carbon layer.

Example 6

A coin-type non-aqueous electrolyte primary battery was assembled in the same manner as in Example 5 except that a carbon layer on a surface of a laminate for a negative electrode had an area weight of 0.02 mg/cm$^2$.

Example 7

A coin-type non-aqueous electrolyte primary battery was assembled in the same manner as in Example 5 except that a carbon layer on a surface of a laminate for a negative electrode had an area weight of 0.2 mg/cm$^2$.

Example 8

A coin-type non-aqueous electrolyte primary battery was assembled in the same manner as in Example 5 except that a carbon layer on a surface of a laminate for a negative electrode had an area weight of 1 mg/cm$^2$.

Comparative Example 1

The slurry prepared in Example 1 was applied to a surface of a lithium foil with a thickness of 1.2 mm and was dried to produce a laminate of the lithium layer and a carbon layer in which the carbon layer was formed on the entire surface of the lithium layer. The carbon layer had an area weight of 0.5 mg/cm$^2$. A coin-type non-aqueous electrolyte primary battery was assembled in the same manner as in Example 1 except that the laminate was used instead of the laminate for a negative electrode of Example 1.

Comparative Example 2

A coin-type non-aqueous electrolyte primary battery was assembled in the same manner as in Comparative Example 1 except that the slurry prepared in Example 5 was used to form a carbon layer.

Comparative Example 3

A coin-type non-aqueous electrolyte primary battery was assembled in the same manner as in Example 1 except that the battery was assembled by using the laminate of the lithium layer and the aluminum layer as it was without applying the composition for forming a carbon layer to a surface of the laminate.

The batteries of Examples 1-8 and Comparative Examples 1-3 were maintained in a thermostatic oven at −40° C. After the temperature of each of the batteries decreased, they were discharged at a current of 10 mA. The discharge voltage (CCV) of each of the batteries eight milliseconds after the start of discharge was measured to evaluate the load characteristics of each battery at a low temperature before storage.

Figure 2:
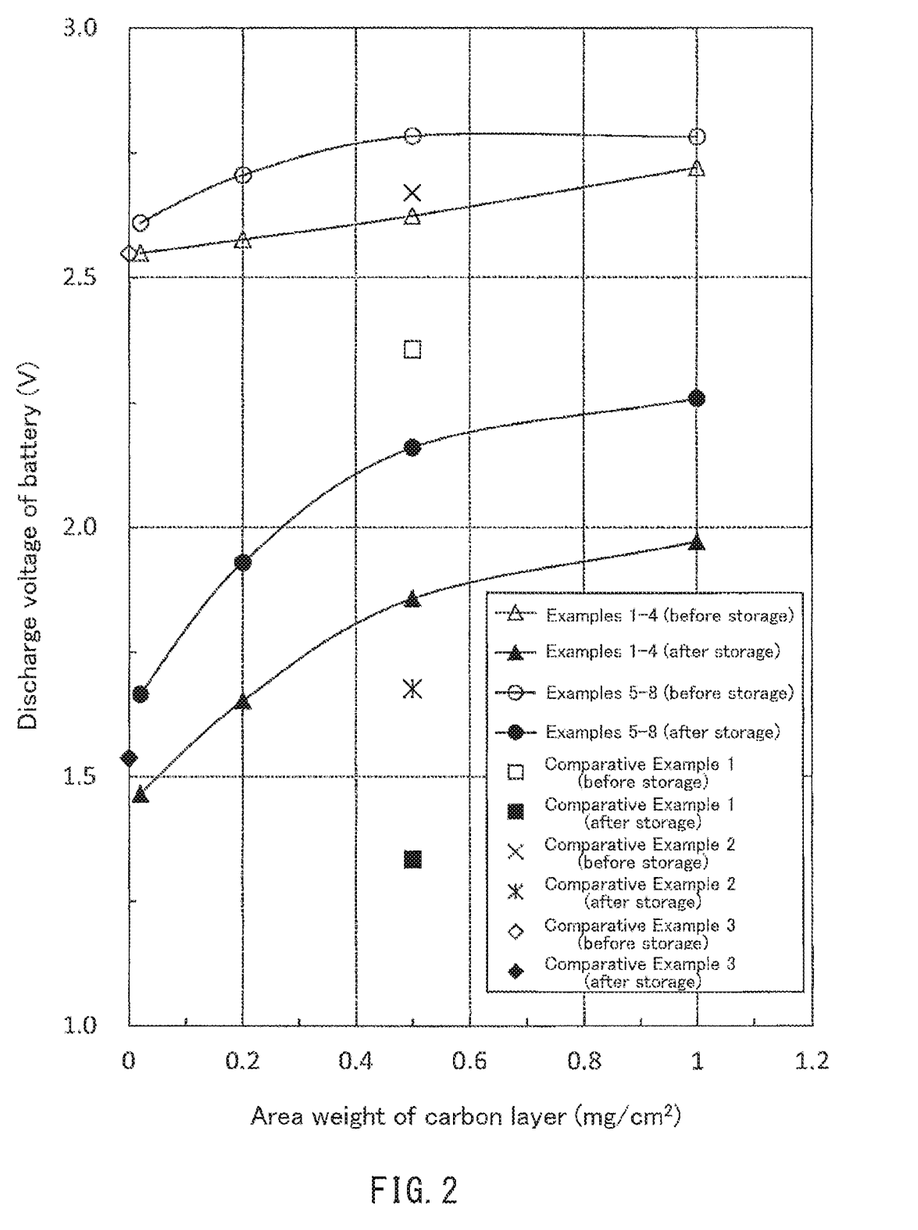
FIG. 2 is a graph illustrating measurement results of the discharge voltage of non-aqueous electrolyte batteries of Examples.

Separately from the above evaluation, after the batteries of Examples 1-8 and Comparative Examples 1-3 were stored in a high temperature environment of 120° C. for 500 hours, the discharge voltage of each of the batteries was measured as above to evaluate the load characteristics of each battery at a low temperature after high temperature storage. Table 1 and FIG. 2 indicate the evaluation results.

TABLE 1

| | Solvent of composition for forming carbon layer | Area weight of carbon layer (mg/cm$^2$) | Discharge voltage at −40° C. (V) Before storage | Discharge voltage at −40° C. (V) After high temperature storage | Drop in voltage due to storage (V) |
|---|---|---|---|---|---|
| Ex. 1 | PC | 0.5 | 2.623 | 1.857 | 0.766 |
| Ex. 2 | | 0.02 | 2.549 | 1.465 | 1.084 |
| Ex. 3 | | 0.2 | 2.576 | 1.653 | 0.923 |
| Ex. 4 | | 1 | 2.720 | 1.971 | 0.749 |
| Ex. 5 | DME | 0.5 | 2.784 | 2.160 | 0.624 |
| Ex. 6 | | 0.02 | 2.610 | 1.666 | 0.944 |
| Ex. 7 | | 0.2 | 2.706 | 1.930 | 0.776 |
| Ex. 8 | | 1 | 2.782 | 2.259 | 0.523 |
| Comp. Ex. 1 | PC | 0.5 | 2.356 | 1.334 | 1.022 |
| Comp. Ex. 2 | DME | 0.5 | 2.669 | 1.677 | 0.992 |
| Comp. Ex. 3 | — | 0 | 2.548 | 1.538 | 1.010 |

* Ex: Example, Comp. Ex.: Comparative Example

In each of the batteries of Examples 1-4 and 5-8, the lithium-aluminum alloy layer was formed on the surface of the lithium layer of the negative electrode, and the carbon layer was further formed on the lithium-aluminum alloy layer. As indicated by the results in FIG. 2, in those batteries, in both cases before the storage and after the high temperature storage, the larger the "area weight of carbon layer" was, the higher the "discharge voltage of battery" was, and the load characteristics of each battery at a low temperature were able to be improved.

Moreover, in each of the batteries of Examples 5-8, DME was used as the solvent of the composition for forming a carbon layer. In each of the batteries of Examples 1-4, PC was used. The discharge voltage of the batteries of Examples 5-8 was able to be higher than those of each of the batteries of Examples 1-4. Further, each of the batteries of Examples 5-8 was able to suppress the drop in the discharge voltage due to the high temperature storage better than each of the batteries of Examples 1-4. The reasons for this are considered as follows. The composition for forming a carbon layer in which DME was used as the solvent exhibited better dispersibility of the carbon, and thus was able to form a uniform carbon layer. Moreover, a problem such as the generation of lithium carbonate when PC was used as the solvent did not occur.

On the other hand, in each of the batteries of Comparative Examples 1 and 2, the carbon layer was formed directly on the surface of the lithium layer. Though the area weight of the carbon layer in each of the batteries of Comparative Examples 1 and 2 was as large as 0.5 mg/cm$^2$, the drop in the discharge voltage due to the high temperature storage was as large as about 1 V. In the battery of Comparative Example 3, the lithium-aluminum alloy layer was formed on the surface of the lithium layer, but a carbon layer was not formed thereon. In the battery of Comparative Example 3, the drop in the discharge voltage due to the high temperature storage was as large as about 1 V as in the batteries of Comparative Examples 1 and 2.

As indicated in Table 1, it is possible to sufficiently suppress the drop in the discharge voltage due to the high temperature storage by forming the lithium-aluminum alloy layer between the lithium layer and the carbon layer in the battery of the present invention even though the area weight of the carbon layer is small.

The present invention can be embodied in other forms without departing from the spirit or essential characteristics thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The non-aqueous electrolyte battery of the present invention is primarily in the form of a primary battery but can be in the form of a secondary battery. The non-aqueous electrolyte battery can be used in various applications in which conventionally known non-aqueous electrolyte primary batteries or non-aqueous electrolyte secondary batteries are employed.

DESCRIPTION OF REFERENCE NUMERALS

1 Non-aqueous electrolyte battery
2 Positive electrode
3 Negative electrode
4 Separator
5 Outer can
6 Sealing can
7 Insulating gasket

The invention claimed is:

1. A non-aqueous electrolyte battery, comprising:
a positive electrode;
a negative electrode;
a separator; and
a non-aqueous electrolyte,
wherein the negative electrode comprises a lithium layer, a lithium-aluminum alloy layer formed on a surface of the lithium layer, and a carbon layer on the lithium-aluminum alloy layer.

2. The non-aqueous electrolyte battery according to claim 1, wherein the carbon layer has an area weight of 0.15 mg/cm$^2$ or more.

3. The non-aqueous electrolyte battery according to claim 1, wherein the carbon layer has an area weight of 1.5 mg/cm$^2$ or less.

4. The non-aqueous electrolyte battery according to claim 2, wherein the carbon layer has an area weight of 1.5 mg/cm$^2$ or less.

5. The non-aqueous electrolyte battery according to claim 1, wherein the carbon layer contains carbon black or graphite.

6. The non-aqueous electrolyte battery according to claim 2, wherein the carbon layer contains carbon black or graphite.

7. The non-aqueous electrolyte battery according to claim 1, wherein the carbon layer contains a binder.

8. The non-aqueous electrolyte battery according to claim 2, wherein the carbon layer contains a binder.

9. The non-aqueous electrolyte battery according to claim 1, wherein the positive electrode comprises, as a positive electrode active material, manganese dioxide or a lithium-containing manganese oxide that has the same crystal structure as that of manganese dioxide and a Li content of 3.5% by mass or less.

10. The non-aqueous electrolyte battery according to claim 2, wherein the positive electrode comprises, as a positive electrode active material, manganese dioxide or a lithium-containing manganese oxide that has the same crystal structure as that of manganese dioxide and a Li content of 3.5% by mass or less.

11. The non-aqueous electrolyte battery according to claim 1, wherein a proportion of an area where the lithium-aluminum alloy layer is formed on the surface of the lithium layer is 40% or more.

12. The non-aqueous electrolyte battery according to claim 2, wherein a proportion of an area where the lithium-aluminum alloy layer is formed on the surface of the lithium layer is 40% or more.

13. The non-aqueous electrolyte battery according to claim 9, wherein the lithium-aluminum alloy layer is formed on the entire surface of the lithium layer.

14. The non-aqueous electrolyte battery according to claim 10, wherein the lithium-aluminum alloy layer is formed on the entire surface of the lithium layer.

15. The non-aqueous electrolyte battery according to claim 1, wherein a proportion of an area where the carbon layer is formed on a surface of the lithium-aluminum alloy layer is 70% or more.

16. The non-aqueous electrolyte battery according to claim 2, wherein a proportion of an area where the carbon layer is formed on a surface of the lithium-aluminum alloy layer is 70% or more.

17. The non-aqueous electrolyte battery according to claim 15, wherein the carbon layer is formed on the entire surface of the lithium-aluminum alloy layer.

18. The non-aqueous electrolyte battery according to claim 16, wherein the carbon layer is formed on the entire surface of the lithium-aluminum alloy layer.

* * * * *